(12) United States Patent
Shimmo et al.

(10) Patent No.: US 8,810,912 B2
(45) Date of Patent: Aug. 19, 2014

(54) ERECTING EQUAL-MAGNIFICATION LENS ARRAY PLATE, OPTICAL SCANNING UNIT, IMAGE READING DEVICE, AND IMAGE WRITING DEVICE

(75) Inventors: Katsuhide Shimmo, Minato-ku (JP); Shiro Sato, Minato-ku (JP); Yuji Hiranuma, Minato-ku (JP); Kazuto Kase, Minato-ku (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 232 days.

(21) Appl. No.: 13/411,831

(22) Filed: Mar. 5, 2012

(65) Prior Publication Data

US 2012/0224242 A1 Sep. 6, 2012

(30) Foreign Application Priority Data

Mar. 3, 2011 (JP) ................................. 2011-046816

(51) Int. Cl.
*G02B 27/10* (2006.01)
*G02B 3/00* (2006.01)
*B41J 2/45* (2006.01)

(52) U.S. Cl.
CPC *G02B 3/0062* (2013.01); *B41J 2/45* (2013.01)
USPC ........ 359/622; 359/201.1; 359/621; 347/238; 358/474

(58) Field of Classification Search
CPC ........... G02B 27/0966; G02B 27/0961; G02B 3/0062; G02B 3/0068; B41J 2/451; B41J 2/45; H04N 2201/03112; H04N 2201/03145
USPC .............. 359/204.1–207.11, 740–743, 201.1, 359/619, 621–623; 347/244, 258, 233, 238; 358/296, 483, 474–475, 494
See application file for complete search history.

(56) References Cited

U.S. PATENT DOCUMENTS

2010/0067070 A1* 3/2010 Mamada et al. .............. 358/475
2011/0134495 A1* 6/2011 Nagata .......................... 358/474

FOREIGN PATENT DOCUMENTS

JP      2009-069801 A      4/2009

* cited by examiner

*Primary Examiner* — James Phan
(74) *Attorney, Agent, or Firm* — Sughrue Mion, PLLC

(57) ABSTRACT

An erecting equal-magnification lens array plate includes a first lens array plate and a second lens array plate provided opposite to each other, each of the first and second lens array plates being formed with a plurality of lenses on both sides thereof. The first lens array plate is provided with a first lens-to-lens distance determining part. The second lens array plate is provided with a second lens-to-lens distance determining part. The distance between opposite lenses is determined by the contact between the first lens-to-lens distance determining part and the second lens-to-lens distance determining part.

16 Claims, 4 Drawing Sheets

ERECTING EQUAL-MAGNIFICATION LENS ARRAY PLATE, OPTICAL SCANNING UNIT, IMAGE READING DEVICE, AND IMAGE WRITING DEVICE

BACKGROUND OF THE INVENTION

1. Field of the Invention

The present invention relates to an erecting equal-magnification lens array plate used in image reading devices and image writing devices.

2. Description of the Related Art

Some image reading devices such as scanners are known to use erecting equal-magnification optical systems. Erecting equal-magnification optics are capable of reducing the size of devices better than reduction optics. In the case of image reading devices, an erecting equal-magnification optical system comprises a linear light source, an erecting equal-magnification lens array, and a linear image sensor.

A rod lens array capable of forming an erect equal-magnification image is used as an erecting equal-magnification lens array in an erecting equal-magnification optical system. Normally, a rod lens array comprises an arrangement of rod lenses in the longitudinal direction (main scanning direction of the image reading device) of the lens array. By increasing the number of rows of rod lenses, the proportion of light transmitted is improved and unevenness in the amount of light transmitted is reduced. Due to cost concerns, it is common to use one or two rows of rod lenses in an array.

Meanwhile, an erecting equal-magnification lens array plate could be formed as a stack of two transparent lens array plates built such that the optical axes of individual convex lenses are aligned, where each transparent lens array plate includes a systematic arrangement of micro-convex lenses on both surfaces of the plate. Since an erecting equal-magnification lens array plate such as this can be formed by, for example, injection molding, an erecting equal-magnification lens array can be manufactured at a relatively low cost.

An erecting equal-magnification lens array plate lacks a wall for beam separation between adjacent lenses. Therefore, there is a problem in that a light beam diagonally incident on an erecting equal-magnification lens array plate travels diagonally inside the plate and enters an adjacent convex lens, creating noise (referred to as ghost noise) as it leaves the plate.

There is known an erecting equal-magnification lens array plate in which a light-shielding member (hereinafter, referred to as an intermediate light-shielding member) is provided between the two lens array plates in order to reduce ghost noise (see, for example, patent document No. 1).

[patent document No. 1] JP2009-069801

The intermediate light-shielding member of the erecting equal-magnification lens array plate disclosed in patent document 1 is sandwiched by two lens array plates. In other words, the lens-to-lens distance of the two lens array plates is determined by the thickness of the intermediate light-shielding member. In the erecting equal-magnification lens array plate, the lens-to-lens distance counts highly for the purpose of achieving desired optical property. Therefore, the thickness of the intermediate light-shielding member should be precisely controlled in the case of the erecting equal-magnification lens array plate disclosed in patent document 1.

The intermediate light-shielding member is formed by, for example, injection molding, using a light absorbing material such as black ABS resin. The intermediate light-shielding member is formed by a pin-shaped mold that forms a through hole and a receiving mold coupled to the pin-shaped mold, in order to provide a plurality of openings (through holes) corresponding to the plurality of lenses of the lens array plates. However, since a pin-shaped mold is used in manufacturing the plate, burrs extending along pins (also called, vertical burrs) are likely to occur from the through hole in a direction that runs perpendicularly to the lens plate. Where the intermediate light-shielding member is sandwiched between two lens array plates as in patent document 1, a vertical burr occurring in a through hole may be sandwiched between the through hole and the lens, creating a gap and adversely affecting the optical property. The problem will be solved shaving the burrs by polishing. Since the burrs are very small, however, it would not be easy to remove the burrs. Even if the burrs can be removed, the manufacturing cost is increased due to the extra step of removing the burrs.

SUMMARY OF THE INVENTION

The present invention addresses the aforementioned disadvantage and a purpose thereof is to provide an erecting equal-magnification lens array plate capable of achieving desired optical property and to provide an optical scanning unit, an image reading device, and an image writing device in which the erecting equal-magnification lens array plate is used.

To address the aforementioned purpose, the erecting equal-magnification lens array plate comprises a first lens array plate and a second lens array plate provided opposite to each other, each of the first and second lens array plates being formed with a plurality of lenses on both sides thereof, wherein the first lens array plate and/or the second lens array plate is provided with a lens-to-lens distance determining part configured to determine a distance between opposite lenses.

The lens-to-lens distance determining part may be formed to be integral with the first lens array plate and/or the second lens array plate.

The lens-to-lens distance determining part may be formed to protrude from a portion on the opposing surface of the first lens array plate and/or the second lens array plate outside the lenses.

The lens-to-lens distance determining part may be formed to extend in the main scanning direction of the lens array plate.

The lens-to-lens distance determining part may be formed in each of the first lens array plate and the second lens array plate, and a distance between the opposite lenses is determined by the contact between the lens-to-lens distance determining parts.

The first lens array plate and the second lens array plate may be shaped substantially identically.

The lens-to-lens distance determining part may be formed in each of the first lens array plate or the second lens array plate, and a distance between the opposite lenses is determined by the contact between the lens-to-lens distance determining parts.

The erecting equal-magnification lens array plate may further comprise an intermediate light-shielding member provided between the first lens array plate and the second lens array plate so as to be distanced from at least one of the plates.

Another embodiment of the present invention also relates to an erecting equal-magnification lens array plate. The erecting equal-magnification lens array plate comprises a first lens array plate and a second lens array plate provided opposite to each other, each of the first and second lens array plates being formed with a plurality of lenses on both sides thereof, and further comprises: a light-shielding member provided to cover the outer surface of the second lens array plate. The light-shielding member is provided with a lens-to-lens distance determining part configured to determine a distance between opposite lenses of the first lens array plate and the second lens array plate.

The light-shielding member may be provided with a light shielding part configured to cover the outer surface of the second lens array plate, and a lens-to-lens distance determining part configured to protrude from the light shielding part. The position of the second lens array plate relative to the light-shielding member may be determined by the contact with the light shielding part, and the position of the first lens array plate relative to the light-shielding member may be determined by the contact with the end of the lens-to-lens determining part.

The erecting equal-magnification lens array plate may further comprise an intermediate light-shielding member provided between the first lens array plate and the second lens array plate so as to be distanced from at least one of the plates.

The light-shielding member may be provided with a light shielding part configured to cover the outer surface of the second lens array plate, and a lens-to-lens distance determining part configured to protrude from the light shielding part. The erecting equal-magnification lens array plate may further comprise: an intermediate light-shielding member held in place by the lens-to-lens distance determining part between the first lens array plate and the second lens array plate so as to be distanced from the second lens array plate. The position of the second lens array plate relative to the light-shielding member may be determined by the contact with the light shielding part, and the position of the first lens array plate relative to the light-shielding member may be determined by the contact with the intermediate light-shielding member.

Still another embodiment of the present invention relates to an optical scanning unit. The optical scanning unit comprises: a linear light source configured to illuminate an original to be read; the aforementioned erecting equal-magnification lens array plate configured to condense light reflected by the original to be read; and a linear image sensor configured to receive light transmitted by the erecting equal-magnification lens array plate.

Yet another embodiment of the present invention relates to an image reading device. The image reading device comprises: the aforementioned optical scanning unit; and an image processing unit configured to process an image signal detected by the optical scanning unit.

Still another embodiment of the present invention relates to an image writing device. The image writing device comprises: an LED array comprising an array of a plurality of LED's; the aforementioned erecting equal-magnification lens array plate for condensing light emitted from the LED array; and a photosensitive drum for receiving the light transmitted through the erecting equal-magnification lens array plate.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
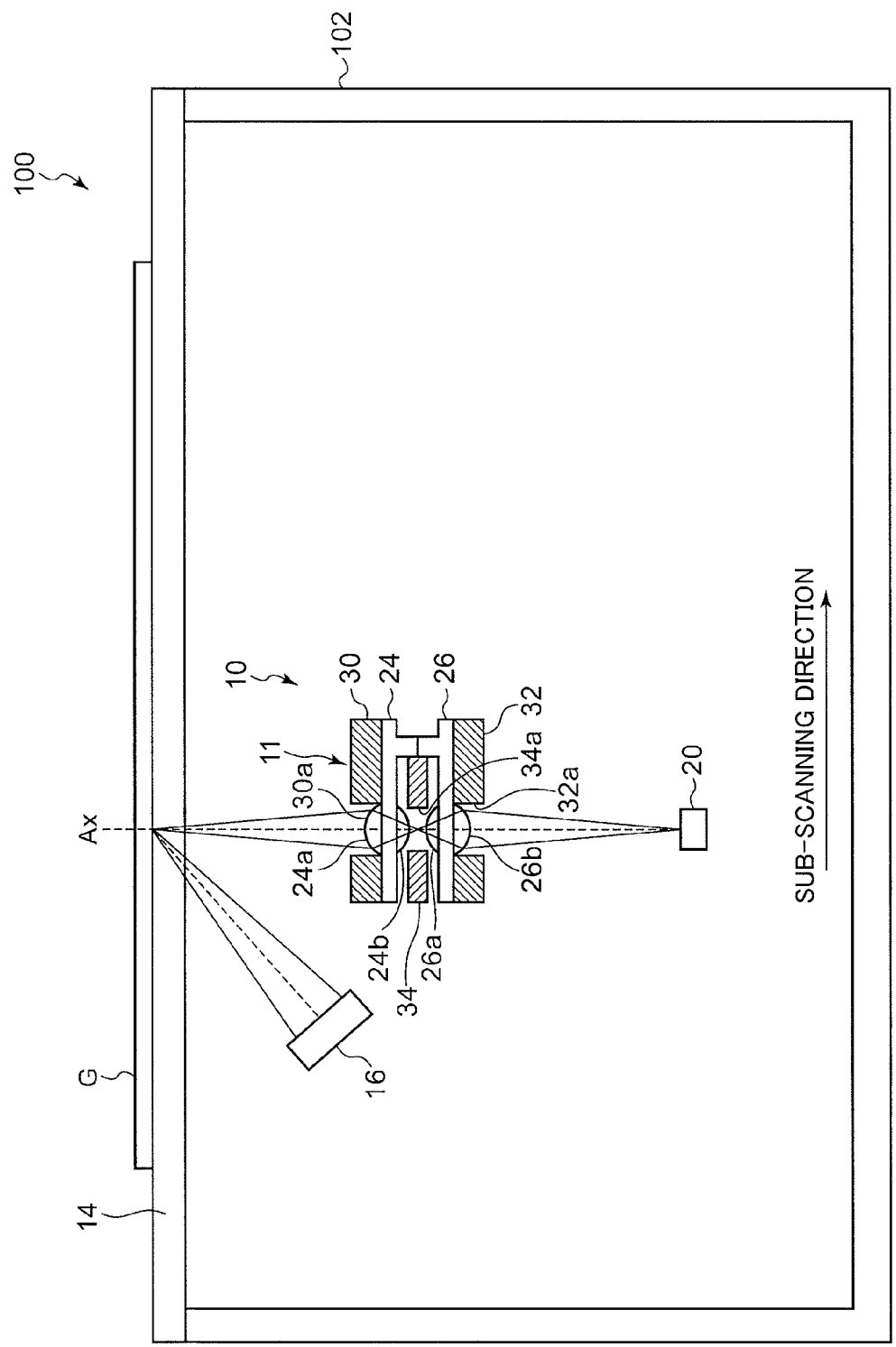
FIG. 1 shows an image reading device according to an embodiment of the present invention.

FIG. 1 shows an image reading device 100 according to an embodiment of the present invention. Referring to FIG. 1, the horizontal direction represents the sub-scanning direction and the depth direction represents the main scanning direction.

As shown in FIG. 1, the image reading device 100 comprises a housing 102, a glass plate 14 on which a document G is placed, an optical scanning unit 10 accommodated in the housing 102, a driving mechanism (not shown) for driving the optical scanning unit 10, and an image processing unit (not shown) for processing data read by the optical scanning unit 10.

The optical scanning unit 10 comprises a linear light source 16 for illuminating a document G placed on a glass plate 14, an erecting equal-magnification lens array plate 11 for condensing light reflected from the document G, a linear image sensor (photoelectric transducer) 20 for receiving light condensed by the erecting equal-magnification lens array plate 11, and a case (not shown) for fixing the linear light source 16, the erecting equal-magnification lens array plate 11, and the linear image sensor 20.

The linear light source 16 is a light source emitting a substantially straight light. The linear light source 16 is secured such that the optical axis thereof passes through the intersection of the optical axis Ax of the erecting equal-magnification lens array plate 11 and the top surface of the glass plate 14. The light exiting from the linear light source 16 illuminates the document G placed on the glass plate 14. The light illuminating the document G is reflected by the document G toward the erecting equal-magnification lens array plate 11.

The erecting equal-magnification lens array plate 11 is configured such that the first lens array plate 24 and the second lens array plate 26 are opposite to each other. Each of the first lens array plate 24 and the second lens array plate 26 is a rectangular plate and is provided with an arrangement of a plurality of convex lenses on both sides thereof. The first lens array plate 24 and the second lens array plate 26 are held by a holder (not shown) in a stacked state.

The first lens array plate 24 and the second lens array plate 26 are formed by injection molding. Preferably, each of the first lens array plate 24 and the second lens array plate 26 is formed of a material amenable to injection molding, having high light transmittance in a desired wavelength range, and having low water absorption. Desired materials include cycloolefin resins, olefin resins, norbornene resins, and polycarbonate.

A plurality of first lenses 24a are arranged in a single line on the outer surface (the surface facing the document) in the longitudinal direction (the main scanning direction) of the first lens array plate 24. A plurality of second lenses 24b are arranged in a single line on the inner surface (the surface facing the second lens array plate 26) of the first lens array plate 24 in the longitudinal direction of the first lens array plate 24.

A plurality of third lenses 26a are arranged in a single line on the inner surface (the surface opposite to the first lens array plate 24) of the second lens array plate 26 in the longitudinal direction (the main scanning direction) of the second lens array plate 26. A plurality of fourth lenses 26b are arranged in a single line on the outer surface (the surface facing the linear image sensor) of the second lens array plate 26 in the longitudinal direction of the second lens array plate 26.

The first lens array plate 24 and the second lens array plate 26 form a stack such that the inner surfaces face each other to ensure that a combination of the first lens 24a, the second lens 24b, the third lens 26a, and the fourth lens 26b aligned with each other form a coaxial lens system. In other words, the first and second lens array plates 24 and 26 form a stack such that the optical axes of the first, second, third, and fourth lenses 24a, 24b, 26a, and 26b aligned with each other are aligned.

A first light-shielding member 30 is provided on the outer surface of the first lens array plate 24. The first light-shielding member 30 is a light-shielding member of a plate form made of a light-shielding material and is formed with a plurality of first through holes 30a. The first through holes 30a are arranged in a single line in the longitudinal direction (the main scanning direction) of the first light-shielding member 30 so as to be in alignment with the first lenses 24a of the first lens array plate 24. The first light-shielding member 30 is provided such that each first through hole 30a is located directly opposite to the corresponding first lens 24a.

A second light-shielding member 32 is provided on the outer surface of the second lens array plate 26. The second light-shielding member 32 is also a light-shielding member of a plate form made of a light-shielding material and is formed with a plurality of second through holes 32a. The second through holes 32a are arranged in a single line in the longitudinal direction (the main scanning direction) of the second light-shielding member 32 so as to be in alignment with the fourth lenses 26b of the second lens array plate 26. The second light-shielding member 32 is provided such that each second through hole 32a is located directly opposite to the corresponding fourth lens 26b.

An intermediate light-shielding member 34 is provided between the first lens array plate 24 and the second lens array plate 26. The intermediate light-shielding member 34 is a light-shielding member of a plate form made of a light-shielding material and is formed with a plurality of intermediate through holes 34a. The intermediate through holes 34a are arranged in a single line in the longitudinal direction (the main scanning direction) of the intermediate light-shielding member 34 so as to be in alignment with the second lenses 24b and the third lenses 26a. The intermediate light-shielding member 34 is provided between the first lens array plate 24 and the second lens array plate 26 such that each intermediate through hole 34a is located directly opposite to the corresponding second lens 24b and third lens 26a. In this embodiment, the intermediate light-shielding member 34 is provided apart from both the first lens array plate 24 and the second lens array plate 26. In other words, the intermediate light-shielding member 34 is not in contact with the first lens array plate 24 or the second lens array plate 26. The intermediate light-shielding member 34 is held in place by a holder (not shown).

The first light-shielding member 30, the second light-shielding member 32, and the intermediate light-shielding member 34 may be formed by, for example, injection molding, using a light absorbing material such as black ABS resin. The first light-shielding member 30, the second light-shielding member 32, and the intermediate light-shielding member 34 have the function of shielding light diagonally transmitted through the erecting equal-magnification lens array plate 11 and reduce the ghost noise.

The erecting equal-magnification lens array plate 11 as constructed above is installed in the image reading device 100 such that the longitudinal direction thereof is aligned with the main scanning direction and the lateral direction thereof is aligned with the sub-scanning direction.

The erecting equal-magnification lens array plate 11 is configured to receive linear light reflected from the document G located above and form an erect equal-magnification image on an image plane located below, i.e., a light-receiving surface of the linear image sensor 20. The image reading device 100 can read the document G by scanning document G with the optical scanning unit 10 in the sub-scanning direction.

Figure 2:
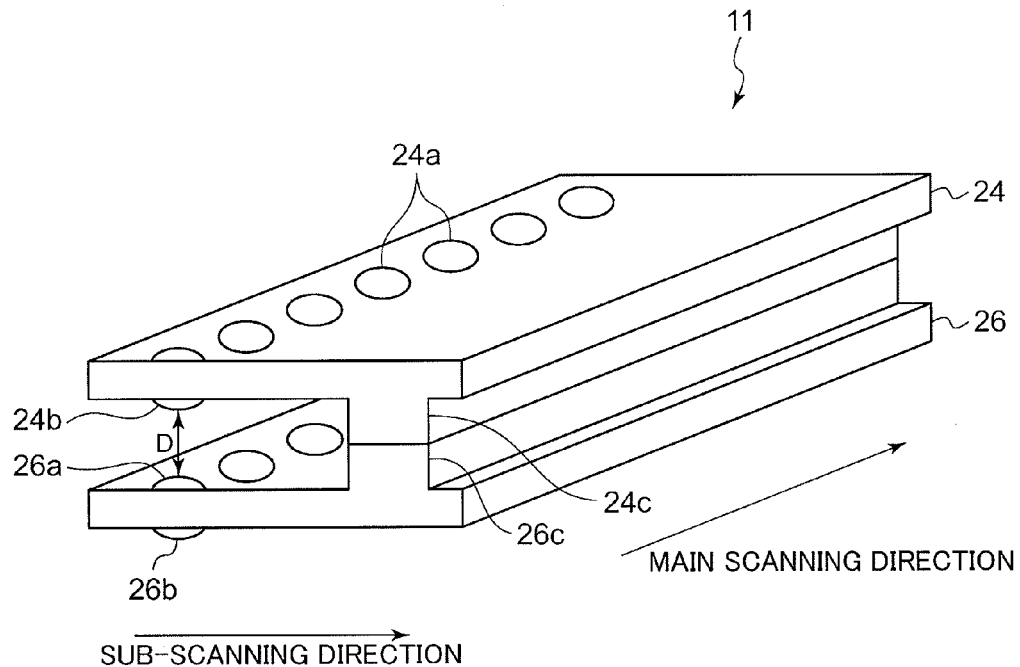
FIG. 2 is a schematic perspective view of an erecting equal-magnification lens array plate according to the embodiment.

FIG. 2 is a schematic perspective view of an erecting equal-magnification lens array plate according to the embodiment. FIG. 2 only shows the first lens array plate 24 and the second lens array plate 26. Illustration of the first light-shielding member 30, the second light-shielding member 32, and the intermediate light-shielding member 34 is omitted.

As shown in FIG. 2, the first lens array plate 24 is provided with a first lens-to-lens distance determining part 24c formed to project from a portion on the surface opposite to the second lens array plate 26 outside the second lenses 24b. Further, the second lens array plate 26 is provided with a second lens-to-lens distance determining part 26c formed to project from a portion on the surface opposite to the first lens array plate 24 outside the third lenses 26a. The first lens-to-lens distance determining part 24c and the second lens-to-lens distance determining part 26c are provided to determine a distance D (hereinafter, also referred to as lens-to-lens distance D) between the second lens 24b and the third lens 26a opposite to each other.

The first lens-to-lens distance determining part 24c and the second lens-to-lens distance determining part 26c are formed to extend in the longitudinal direction (the main scanning direction) of the respective lens array plate. Each lens-to-lens distance determining part is illustrated in FIG. 2 as a protrusion continuously extending in the main scanning direction. Alternatively, the lens-to-lens distance determining part may be formed discontinuously. The ends of the first lens-to-lens distance determining part 24c and the second lens-to-lens distance determining part 26c are formed as flat surfaces. The first lens-to-lens distance determining part 24c and the second lens-to-lens distance determining part 26c are formed to be integral with the first lens array plate 24 and the second lens array plate 26, respectively.

As shown in FIG. 2, the lens-to-lens distance D of the erecting equal-magnification lens array plate 11 is determined by the flat surface of the end of the first lens-to-lens distance determining part 24c contacting the flat surface of the end of the second lens-to-lens distance determining part 26c. The intermediate light-shielding member 34 is not involved in determining the lens-to-lens distance D. By using the first lens-to-lens distance determining part 24c and the second lens-to-lens distance determining part 26c to determine the lens-to-lens distance D instead of using the intermediate light-shielding member 34, the lens-to-lens distance D is less likely subject to variation even if burrs occur in the intermediate through hole 34a of the intermediate light-shielding member 34.

Accuracy of dimension of the lens array plate directly affects the optical property. Therefore, precise control of the thickness thereof is inherently necessary. According to the embodiment a desired (as designed) lens-to-lens distance D can be achieved by providing the function of determining the lens-to-lens distance in the lens array plate the thickness of which is precisely controlled. Meanwhile, since the thickness of the intermediate light-shielding member need not be so precisely controlled, improvement in yield can be expected. Another advantage is that, since the step of removing burrs can be eliminated, the manufacturing cost can be reduced.

If a lens array plate or an intermediate light-shielding member is manufactured by injection molding, re-designing of a lens-to-lens distance will require reforming a molding die. If, in this case, a lens-to-lens distance is determined by using an intermediate light-shielding member as in the related art, re-designing of a lens-to-lens distance will not be easy because it requires reforming of a molding die for an intermediate light-shielding member, which is of a relatively complicated form. By using a lens-to-lens distance determining part as in the embodiment, however, all that is required is to modify the height of the lens-to-lens distance determining part, which is of relatively simple form. Therefore, the lens-to-lens distance can be re-designed easily.

In this embodiment, the first lens array plate 24 and the second lens array plate 26 are shaped substantially identically. Since there is no need to prepare two lens array plates of different shapes in this case, the component cost can be reduced.

Alternatively, the first lens array plate 24 and the second lens array plate 26 may be shaped differently. In the embodiment, the lens-to-lens distance determining part is formed both in the first lens array plate 24 and the second lens array plate 26. Alternatively, the lens-to-lens distance determining part may be formed in only one of the lens array plates so that the lens-to-lens distance determining part is caused to come into contact with the other lens array plate. This will also improve the precision of lens-to-lens distance.

In the embodiment, the intermediate light-shielding member 34 is provided so as to be distanced from both the first lens array plate 24 and the second lens array plate 26. Alternatively, the intermediate light-shielding member 34 may be provided so as to be distanced from only one of the lens array plates. In other words, the intermediate light-shielding member 34 should not be provided such that it is in contact with both lens array plates. This is because the burrs of the intermediate light-shielding member 34 in contact with both lens array plates may affect the lens-to-lens distance.

Figure 3:
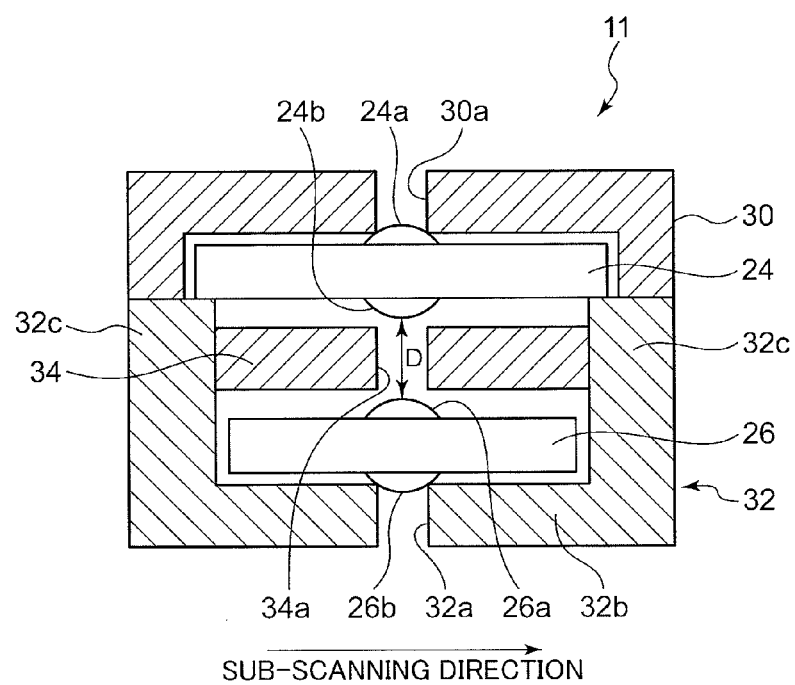
FIG. 3 is a sectional view illustrating an erecting equal-magnification lens array plate according to another embodiment of the present invention.

FIG. 3 is a sectional view illustrating an erecting equal-magnification lens array plate according to another embodiment of the present invention. Referring to FIG. 3, the horizontal direction represents the sub-scanning direction and the depth direction represents the main scanning direction.

As shown in FIG. 3, the erecting equal-magnification lens array plate 11 according to the embodiment is provided with the first lens array plate 24, the second lens array plate 26, the first light-shielding member 30, the second light-shielding member 32, and the intermediate light-shielding member 34. The basic functions of the components are similar to those of the erecting equal-magnification lens array plate shown in FIGS. 1 and 2. The structure for determining the lens-to-lens distance D in the erecting equal-magnification lens array plate 11 according to the embodiment is different from that of the erecting equal-magnification lens array plate shown in FIGS. 1 and 2.

In this embodiment, the second light-shielding member 32 is provided with a planar light shielding part 32b covering the outer surface (the surface facing the linear image sensor) of the second lens array plate 26 and with a lens-to-lens distance determining part 32c formed to protrude from the ends of the light shielding part 32b in the sub-scanning direction. The light shielding part 32b and the lens-to-lens distance determining part 32c are integrally formed. In this embodiment, the lens-to-lens distance determining part 32c provided in the second light-shielding member 32 determines the lens-to-lens distance D.

As shown in FIG. 3, the position of the second lens array plate 26 relative to the second light-shielding member 32 is determined by the contact of the outer surface (the surface facing the linear image sensor) of the second lens array plate 26 with the inner surface of the light shielding part 32b of the second light-shielding member 32. FIG. 3 shows that the fourth lens 26b of the second lens array plate 26 is in contact with the light shielding part 32b. Alternatively, the flat part of the second lens array plate 26 outside the fourth lens 26b may be in contact with the light shielding part 32b.

Meanwhile, the position of the first lens array plate 24 relative to the second light-shielding member 32 is determined by the contact of the inner surface (the surface facing the second lens array plate 26) of the first lens array plate 24 with the end of the lens-to-lens distance determining part 32c. The first light-shielding member 30 is provided on the outer surface of the first lens array plate 24. The first light-shielding member 30 and the second light-shielding member 32 sandwich the first lens array plate 24.

The intermediate light-shielding member 34 is provided so as to distanced from the first lens array plate 24 and the second lens array plate 26. In other words, the intermediate light-shielding member 34 is not in contact with the first lens array plate 24 or the second lens array plate 26. The intermediate light-shielding member 34 is held in place by the lens-to-lens distance determining part 32c.

As described, the lens-to-lens distance D is determined with reference to the second light-shielding member 32. The intermediate light-shielding member 34 is not involved in determining the lens-to-lens distance D. Consequently, the lens-to-lens distance D is less likely subject to variation even if burrs occur in the intermediate through hole 34a of the intermediate light-shielding member 34. The second lens array plate 26 and the light shielding part 32b according to the embodiment are in contact with each other. By manufacturing the second light-shielding member 32 so that the burrs of the second through hole 32a project to the outward direction (the direction of the linear image sensor), variation of the lens-to-lens distance due to detachment of the second lens array plate 26 from the light shielding part 32b is prevented.

All that is required in this embodiment, as in the foregoing embodiment, is to modify the height of the lens-to-lens distance determining part 32c, which is of relatively simple form. Therefore, the lens-to-lens distance can be re-designed easily.

In the embodiment, the intermediate light-shielding member 34 is provided so as to be distanced from both the first lens array plate 24 and the second lens array plate 26. Alternatively, the intermediate light-shielding member 34 may be provided so as to be distanced from only one of the lens array plates. In other words, the intermediate light-shielding member 34 should not be provided such that it is in contact with both lens array plates.

Figure 4:
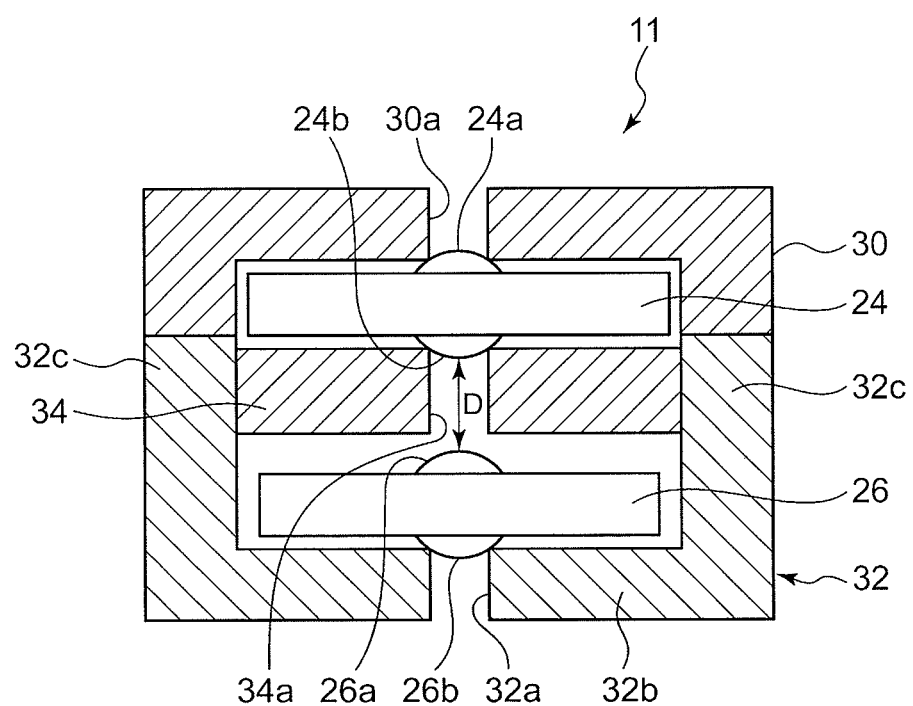
FIG. 4 is a sectional view illustrating an erecting equal-magnification lens array plate according to still another embodiment of the present invention.

FIG. 4 is a sectional view illustrating an erecting equal-magnification lens array plate according to still another embodiment of the present invention. Referring to FIG. 4, the horizontal direction represents the sub-scanning direction and the depth direction represents the main scanning direction.

As shown in FIG. 4, the erecting equal-magnification lens array plate 11 according to the embodiment is provided with the first lens array plate 24, the second lens array plate 26, the first light-shielding member 30, the second light-shielding member 32, and the intermediate light-shielding member 34. The basic functions of the components are similar to those of the erecting equal-magnification lens array plate shown in FIGS. 1 and 2. The structure for determining the lens-to-lens distance D in the erecting equal-magnification lens array plate 11 according to the embodiment is different from that of the aforementioned erecting equal-magnification lens array plate.

In this embodiment, the second light-shielding member 32 is provided with a planar light shielding part 32b covering the outer surface (the surface facing the linear image sensor) of the second lens array plate 26 and with a lens-to-lens distance determining part 32c formed to protrude from the ends of the light shielding part 32b in the sub-scanning direction. The light shielding part 32b and the lens-to-lens distance determining part 32c are integrally formed.

In this embodiment, the intermediate light-shielding member 34 is held in place by the lens-to-lens distance determining part 32c of the second light-shielding member 32, remaining distanced from the second lens array plate 26.

As shown in FIG. 4, the position of the second lens array plate 26 relative to the second light-shielding member 32 is determined by the contact of the outer surface of the second lens array plate 26 with the inner surface of the light shielding part 32b of the second light-shielding member 32. FIG. 4 shows that the fourth lens 26b of the second lens array plate 26 is in contact with the light shielding part 32b. Alternatively, the flat part of the second lens array plate 26 outside the fourth lens 26b may be in contact with the light shielding part 32b.

Meanwhile, the position of the first lens array plate 24 relative to the second light-shielding member 32 is determined by the contact of the inner surface of the first lens array plate 24 with the top surface (the surface facing the document) of the intermediate light-shielding member 34. The first light-shielding member 30 is provided on the outer surface of the first lens array plate 24. The first light-shielding member 30 and the second light-shielding member 32 sandwich the first lens array plate 24.

As described, according to this embodiment, the position of the second lens array plate 26 is determined by the second light-shielding member 32, and the position of the first lens array plate 24 is determined by the second light-shielding member 32 via the intermediate light-shielding member 34. The lens-to-lens distance D in this embodiment is also determined with reference to the second light-shielding member 32.

The intermediate light-shielding member 34 and the first lens array plate 24 according to the embodiment are in contact with each other. By manufacturing the intermediate light-shielding member 34 so that the burrs of the intermediate through hole 34a project to the outward direction (toward the second lens array plate), variation of the lens-to-lens distance due to the burrs is prevented.

All that is required in this embodiment is to modify the position where the intermediate light-shielding member 34 is held in place by the second light-shielding member 32. Therefore, the lens-to-lens distance can be re-designed easily.

Figure 5:
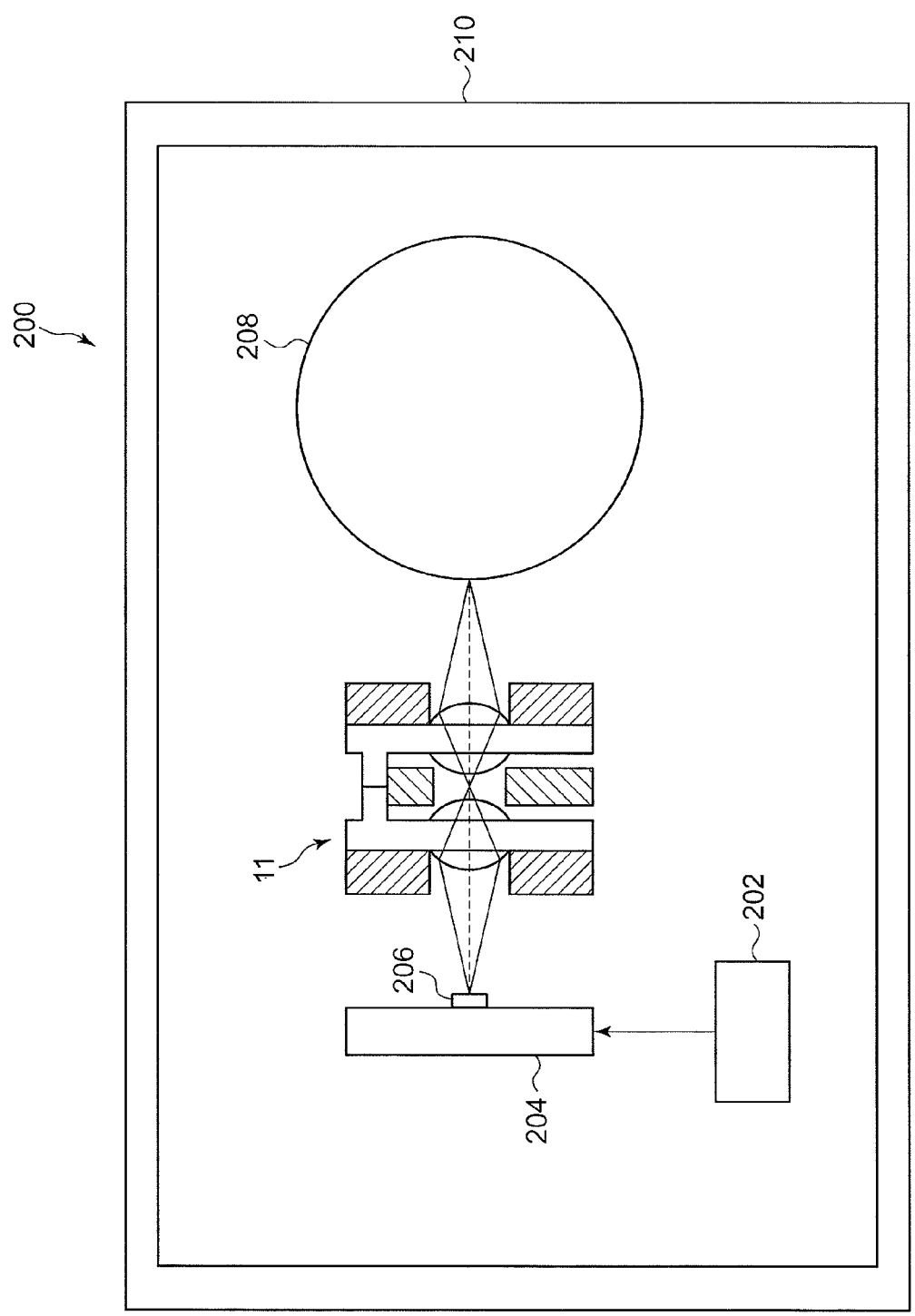
FIG. 5 shows an image writing device according to yet another embodiment of the present invention.

FIG. 5 shows an image writing device 200 according to another embodiment of the present invention. As shown in FIG. 5, the image writing device 200 comprises an LED array 206 comprising an array of a plurality of LED's, a substrate 204 on which the LED array 206 is mounted, a control unit 202 configured to control the LED array 206, the aforementioned erecting equal-magnification lens array plate 11 for condensing light emitted from the LED array 206, a photosensitive drum 208 for receiving the light transmitted through the erecting equal-magnification lens array plate 11, and a housing 210 for accommodating the components. In FIG. 5, the developer device, the transferring device, etc. provided around the photosensitive drum 208 are omitted from the illustration. The explanation given above of the image reading device 100 also applies to the image writing device by replacing the document G of the image reading device 100 shown in FIG. 1 by the photosensitive drum 208 in the image writing device 200 and further replacing the linear image sensor 20 of the image reading device 100 by the LED array 206 in the image writing device 200.

The image writing device 200 is provided with an LED print head which uses LED's as light sources. When an LED print head is used, pixels correspond one to one to light-emitting sources so that no mechanisms for scanning are necessary. Therefore, the size and weight of the device can be reduced as compared with a laser raster output scanner (ROS) system in which a laser light source and a polygon mirror are combined.

In the related art, a rod lens array is used as an erecting equal-magnification lens array plate in a device in which an LED print head is used. By using the erecting equal-magnification lens array plate 11 according to the present invention, the cost of the image writing device 200 can be reduced. By using the erecting equal-magnification lens array plate 11 according to the present invention, desired optical property can be achieved so that a high-quality image can be formed on the photosensitive drum 208.

Described above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. An erecting equal-magnification lens array plate comprising a first lens array plate and a second lens array plate provided opposite to each other, each of the first and second lens array plates being formed with a plurality of lenses on both sides thereof,
   wherein the first lens array plate and/or the second lens array plate is provided with a lens-to-lens distance determining part configured to determine a distance between opposite lenses, and
   wherein the lens-to-lens distance determining part is formed to protrude from a portion on the opposing surface of the first lens array plate and/or the second lens array plate outside the lenses.

2. The erecting equal-magnification lens array plate according to claim 1,
   wherein the lens-to-lens distance determining part is formed to be integral with the first lens array plate and/or the second lens array plate.

3. The erecting equal-magnification lens array plate according to claim 1,
   wherein the lens-to-lens distance determining part is formed to extend in the main scanning direction of the lens array plate.

4. The erecting equal-magnification lens array plate according to claim 1,
   wherein the lens-to-lens distance determining part is formed in each of the first lens array plate and the second lens array plate, and a distance between the opposite lenses is determined by the contact between the lens-to-lens distance determining parts.

5. The erecting equal-magnification lens array plate according to claim 4, wherein the first lens array plate and the second lens array plate are shaped substantially identically.

6. The erecting equal-magnification lens array plate according to claim 1,
wherein the lens-to-lens distance determining part is formed in each of the first lens array plate or the second lens array plate, and a distance between the opposite lenses is determined by the contact between the lens-to-lens distance determining parts.

7. The erecting equal-magnification lens array plate according to claim 1, further comprising:
an intermediate light-shielding member provided between the first lens array plate and the second lens array plate so as to be distanced from at least one of the plates.

8. An optical scanning unit comprising:
a linear light source configured to illuminate an original to be read;
the erecting equal-magnification lens array plate according to claim 1 configured to condense light reflected by the original to be read; and
a linear image sensor configured to receive light transmitted by the erecting equal-magnification lens array plate.

9. An image reading device comprising:
the optical scanning unit according to claim 8; and
an image processing unit configured to process an image signal detected by the optical scanning unit.

10. An image writing device comprising:
an LED array comprising an array of a plurality of LED's;
the erecting equal-magnification lens array plate according to claim 1 for condensing light emitted from the LED array; and
a photosensitive drum for receiving the light transmitted through the erecting equal-magnification lens array plate.

11. An erecting equal-magnification lens array plate comprising a first lens array plate and a second lens array plate provided opposite to each other, each of the first and second lens array plates being formed with a plurality of lenses on both sides thereof, and further comprising:
a light-shielding member provided to cover the outer surface of the second lens array plate; and
an intermediate light-shielding member provided between the first lens array plate and the second lens array plate so as to be distanced from at least one of the plates,
wherein the light-shielding member is provided with a lens-to-lens distance determining part configured to determine a distance between opposite lenses of the first lens array plate and the second lens array plate.

12. The erecting equal-magnification lens array plate according to claim 11,
wherein the light-shielding member is provided with a light shielding part configured to cover the outer surface of the second lens array plate, and a lens-to-lens distance determining part configured to protrude from the light shielding part,
the position of the second lens array plate relative to the light-shielding member is determined by the contact with the light shielding part, and
the position of the first lens array plate relative to the light-shielding member is determined by the contact with the end of the lens-to-lens determining part.

13. An optical scanning unit comprising:
a linear light source configured to illuminate an original to be read;
the erecting equal-magnification lens array plate according to claim 11 configured to condense light reflected by the original to be read; and
a linear image sensor configured to receive light transmitted by the erecting equal-magnification lens array plate.

14. An image reading device comprising:
the optical scanning unit according to claim 13; and
an image processing unit configured to process an image signal detected by the optical scanning unit.

15. An image writing device comprising:
an LED array comprising an array of a plurality of LED's;
the erecting equal-magnification lens array plate according to claim 11 for condensing light emitted from the LED array; and
a photosensitive drum for receiving the light transmitted through the erecting equal-magnification lens array plate.

16. An erecting equal-magnification lens array plate comprising a first lens array plate and a second lens array plate provided opposite to each other, each of the first and second lens array plates being formed with a plurality of lenses on both sides thereof, and further comprising:
a light-shielding member provided to cover the outer surface of the second lens array plate,
wherein the light-shielding member is provided with a lens-to-lens distance determining part configured to determine a distance between opposite lenses of the first lens array plate and the second lens array plate,
wherein the light-shielding member is provided with a light shielding part configured to cover the outer surface of the second lens array plate, and a lens-to-lens distance determining part configured to protrude from the light shielding part, the erecting equal-magnification lens array plate further comprising:
an intermediate light-shielding member held in place by the lens-to-lens distance determining part between the first lens array plate and the second lens array plate so as to be distanced from the second lens array plate,
the position of the second lens array plate relative to the light-shielding member is determined by the contact with the light shielding part, and
the position of the first lens array plate relative to the light-shielding member is determined by the contact with the intermediate light-shielding member.

\* \* \* \* \*